(12) United States Patent
Alexander et al.

(10) Patent No.: US 11,739,651 B2
(45) Date of Patent: Aug. 29, 2023

(54) NOZZLE RING FOR A RADIAL TURBINE AND EXHAUST GAS TURBOCHARGER INCLUDING THE SAME

(71) Applicant: Turbo Systems Switzerland Ltd, Baden (CH)

(72) Inventors: Brian Alexander, Carmel, IN (US); Elmar Gröschel, Meisterschwanden (CH); Bernhard Klein, Baden (CH)

(73) Assignee: Turbo Systems Switzerland Ltd, Baden (CH)

( * ) Notice: Subject to any disclaimer, the term of this patent is extended or adjusted under 35 U.S.C. 154(b) by 36 days.

(21) Appl. No.: 17/432,424

(22) PCT Filed: Feb. 21, 2019

(86) PCT No.: PCT/US2019/018909
§ 371 (c)(1),
(2) Date: Aug. 19, 2021

(87) PCT Pub. No.: WO2020/171813
PCT Pub. Date: Aug. 27, 2020

(65) Prior Publication Data
US 2022/0275729 A1  Sep. 1, 2022

(51) Int. Cl.
*F01D 9/04* (2006.01)
*F01D 25/24* (2006.01)

(52) U.S. Cl.
CPC .......... *F01D 9/045* (2013.01); *F01D 25/246* (2013.01); *F05D 2220/40* (2013.01); *F05D 2230/60* (2013.01); *F05D 2240/128* (2013.01); *F05D 2240/14* (2013.01)

(58) Field of Classification Search
CPC ........ F01D 9/045; F01D 9/048; F01D 25/246; F04D 29/22; F04D 29/2261; F04D 29/2272; F04D 29/26; F04D 29/263; F04D 29/266; F04D 29/28; F04D 29/281; F04D 29/284;
(Continued)

(56) References Cited

U.S. PATENT DOCUMENTS

2022/0275729 A1* 9/2022 Alexander .............. F01D 9/045

FOREIGN PATENT DOCUMENTS

| CN | 108729957 A | 11/2018 |
|---|---|---|
| DE | 102007059056 A1 | 6/2009 |
| EP | 2821616 A1 | 1/2015 |

(Continued)

OTHER PUBLICATIONS

Notice of Reasons for Refusal issued in Japanese Patent Application No. 2021-549403, with English translation, dispatched Jan. 17, 2022, 4 pages.
(Continued)

*Primary Examiner* — Christopher R Legendre
(74) *Attorney, Agent, or Firm* — Armstrong Teasdale LLP

(57) ABSTRACT

A nozzle ring for a radial turbine includes a disc-shaped main body having a central opening for passing a shaft therethrough. Additionally, the nozzle ring includes guide vanes disposed circumferentially in a radially outer portion on a first surface of the main body. Two or more bores are provided in a radially inner portion of the main body. Further, a groove is provided in the first surface of the main body, the groove connecting at least two of the two or more bores.

19 Claims, 4 Drawing Sheets

(58) Field of Classification Search
CPC ........... F05D 2220/40; F05D 2240/128; F05D 2240/14
See application file for complete search history.

(56) References Cited

FOREIGN PATENT DOCUMENTS

| | | | |
|---|---|---|---|
| JP | 2004116313 | A | 4/2004 |
| WO | 2008139130 | A1 | 11/2008 |
| WO | 2015009356 | A1 | 1/2015 |
| WO | 2018189319 | A1 | 10/2018 |

OTHER PUBLICATIONS

International Search Report and Written Opinion for International Patent Application No. PCT/US2019/018909, dated Oct. 15, 2019, 12 pages.

\* cited by examiner

NOZZLE RING FOR A RADIAL TURBINE AND EXHAUST GAS TURBOCHARGER INCLUDING THE SAME

CROSS-REFERENCE TO RELATED APPLICATIONS

This application is the U.S. National Stage Application of International Patent Application No. PCT/US2019/018909, filed Feb. 21, 2019, which is hereby incorporated by reference herein.

TECHNICAL FIELD

Embodiments of the present disclosure relate to exhaust gas turbochargers. In particular, embodiments of the present disclosure relate to nozzle rings for radial turbines of exhaust gas turbochargers.

BACKGROUND

Today, exhaust gas turbochargers are widely used to increase the performance of internal combustion engines. An exhaust gas turbocharger typically has a turbine in the exhaust tract of the internal combustion engine and a compressor upstream of the internal combustion engine. The exhaust gas of the internal combustion engine is expanded in the turbine. The work gained is transferred by a shaft to the compressor, which compresses the air supplied to the internal combustion engine. By using the energy of the exhaust gas to compress the air supplied to the combustion process in the internal combustion engine, the combustion process and the efficiency of the internal combustion engine can be optimized. It is to be understood that turbochargers are also used for compression ignition engines.

The thermal and kinetic energy of the exhaust gas is used to drive the turbocharger rotor. In order to ensure safe operation, the exhaust gas jet must be directed onto the turbine wheel. For this purpose and to enable a "matching" of the turbocharger for different applications, a nozzle ring is installed at the outlet of the flow channel in front of the turbine wheel in radial turbine stages.

Depending on the turbine used and the specific operating conditions, the working medium, e.g. exhaust gas, may have a large temperature gradient. For this reason, nozzle rings of exhaust gas turbochargers are typically subjected to high loads due to changing operating conditions, i.e. increasing or decreasing pressure and temperature of the working medium, and thus can be subject to relatively high temperature expansions.

Nozzle rings are often held in position by axially clamping, usually between the turbine housing and the bearing housing. Further, a separate heat shield can be installed if the heat input through the exhaust gas into the bearing housing is too high or if too much energy is withdrawn from the exhaust gas through by other adjacent components. Occasionally it may be necessary to align the nozzle ring to the position of the turbine housing, which can be realized by positioning components such as pin connections.

Another possibility for fixing nozzle rings, e.g. to the bearing housing, is to use fastening means such as fastening bolts or screws. Therefore, typically the nozzle ring is provided with through holes for receiving the respective fastening means.

It has been found, that conventional nozzle rings being mounted by using a bolt-type or screw connection can cause pressure disturbances which may generate turbine blade excitations. Such excitations may generate alternating blade deflections resulting in increased stress and strain levels which may cause material fatigue.

Conventionally, the problem of turbine blade excitation is addressed in the following manners. One option is to provide an inducer or exducer clip resulting in a blade geometry change and hence a change in the resonant frequency to that outside the operating range. Another option is to limit the turbocharger speed in order to avoid reaching the rotor speed of concern. Alternatively, the turbine stage could be redesigned to eliminate or minimize the source or magnitude of the pressure disturbance. However, these measures are relatively complex and costly.

Accordingly, in view of the above, there is a demand for nozzle rings which at least partially overcome the problems of the state of the art, particularly problems associated with turbine blade excitations, such that improved exhaust gas turbochargers can be provided.

SUMMARY

In light of the above, a nozzle ring for a radial turbine according to the independent claim is provided. Further aspects, advantages, and features are apparent from the dependent claims, the description, and the accompanying drawings.

According to an aspect of the present disclosure, a nozzle ring for a radial turbine is provided. The nozzle ring includes a disc-shaped main body having a central opening for passing a shaft there through. Additionally, the nozzle ring includes guide vanes disposed circumferentially in a radially outer portion on a first surface of the main body. Two or more bores are provided in a radially inner portion of the main body. Further, a groove is provided in the first surface of the main body. The groove connects at least two of the two of more bores.

Accordingly, the nozzle ring of the present disclosure is improved compared to conventional nozzle rings. In particular, embodiments of the nozzle ring as described herein, beneficially provide for a reduction of pressure disturbances near the turbine wheel when the nozzle ring is mounted. Further, with the nozzle ring as described herein, rotor blade excitations of the turbine wheel can be reduced or even substantially be avoided. More specifically, providing a nozzle ring with a groove as described herein has the effect that pressure pulses or disturbances created as the rotor blades pass over the respective affixation means can be disbursed through the groove along the disc-shaped main body. Thus, in the present disclosure, the groove of the nozzle ring may also be referred to as "stabilization groove".

According to a further aspect of the present disclosure, an exhaust gas turbocharger is provided. The exhaust gas turbocharger includes a turbine housing, a shaft which is mounted in a bearing housing and on which a turbine wheel with rotor blades is arranged. Additionally, an exhaust gas inlet passage is formed in the turbine housing upstream of the turbine wheel. Further, the exhaust gas turbocharger is provided with a nozzle ring according to any embodiments described herein. The nozzle ring is fixed to the bearing housing by fastening means, particularly heat resistant fastening means, extending through the two or more bores.

Accordingly, compared to conventional exhaust gas turbocharger, embodiments of the exhaust gas turbocharger as described herein are improved, particularly because pressure disturbances near the turbine wheel can be reduced such that rotor blade excitations can be reduced or even substantially be avoided.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

Figure 1:
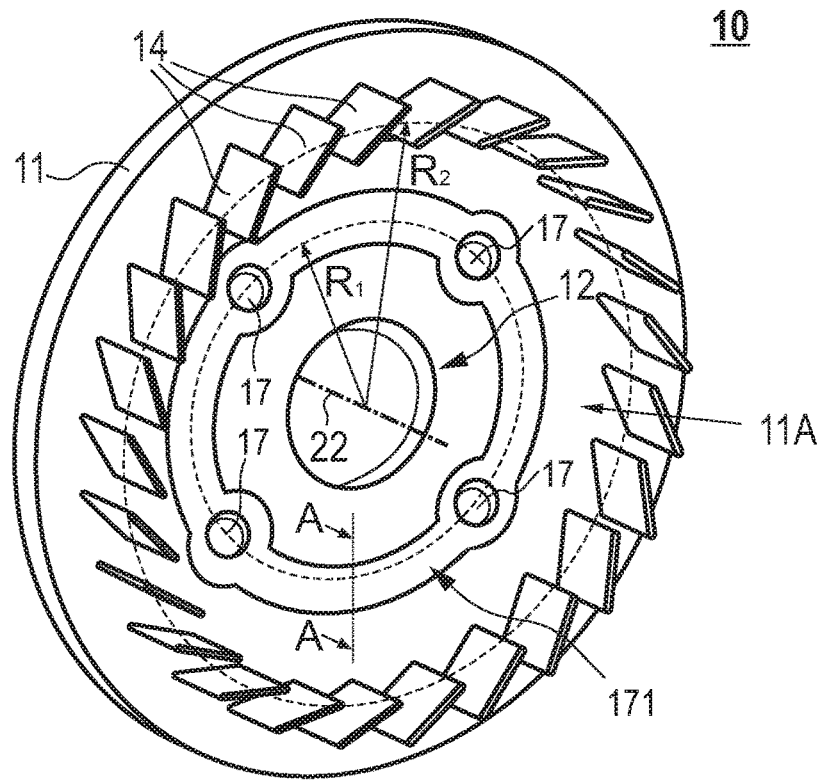
FIG. 1 shows a schematic perspective view on a first side, particularly a turbine side, of a nozzle ring according to embodiments described herein.
Figure 2A:
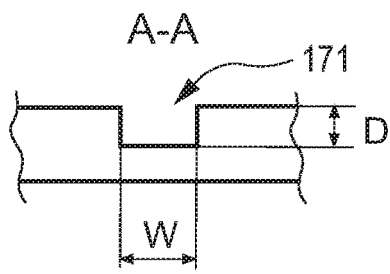
FIGS. 2a to 2d show cross sections along the line A-A indicated in FIG. 1 for illustrating exemplary embodiments of a groove provided in a first surface of the main body of a nozzle ring according to embodiments described herein.
Figure 2B:
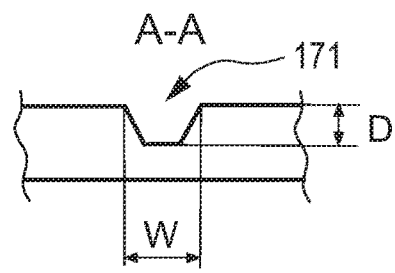
Figure 2C:
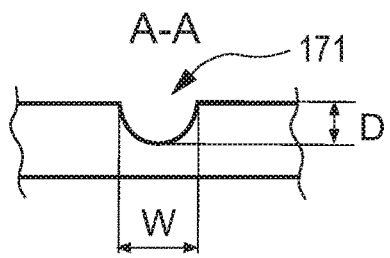
Figure 2D:
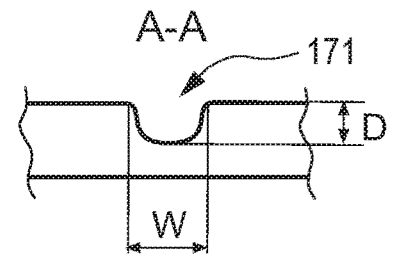

With exemplary reference to FIG. 1, a nozzle ring 10 for a radial turbine turbomachine according to the present disclosure is described. According to embodiments, which can be combined with other embodiments described herein, the nozzle ring includes a disc-shaped main body 11 having a central opening 12 for passing a shaft there through. Additionally, the nozzle ring includes guide vanes 14 disposed circumferentially in a radially outer portion on a first surface 11A of the main body 11. Typically, the first surface 11A is a turbine side of the main body. More specifically, typically the guide vanes are arranged and configured to direct exhaust gas onto rotor blades of a turbine wheel. As exemplarily shown in FIG. 1, typically the guide vanes 14 extend from the first surface 11A of the main body in an axial direction. Further, two or more bores 17 are provided in a radially inner portion of the main body 11. Additionally, a groove 171 is provided in the first surface 11A of the main body 11. The groove 171 connects at least two of the two of more bores 17. In other words, typically the groove is configured such that the groove provides for a path which extends at least from one bore to another bore.

Accordingly, embodiments of the nozzle ring beneficially provide a reduction of pressure disturbances near the turbine wheel when the nozzle ring is mounted. Further, with the nozzle ring as described herein, rotor blade excitations of the turbine wheel can be reduced or even substantially be avoided. More specifically, providing a nozzle ring with a groove as described herein has the effect that a pressure pulse or disturbance created as the rotor blades pass over the respective affixation means can be disbursed through the groove along the disc-shaped main body.

Figure 3A:
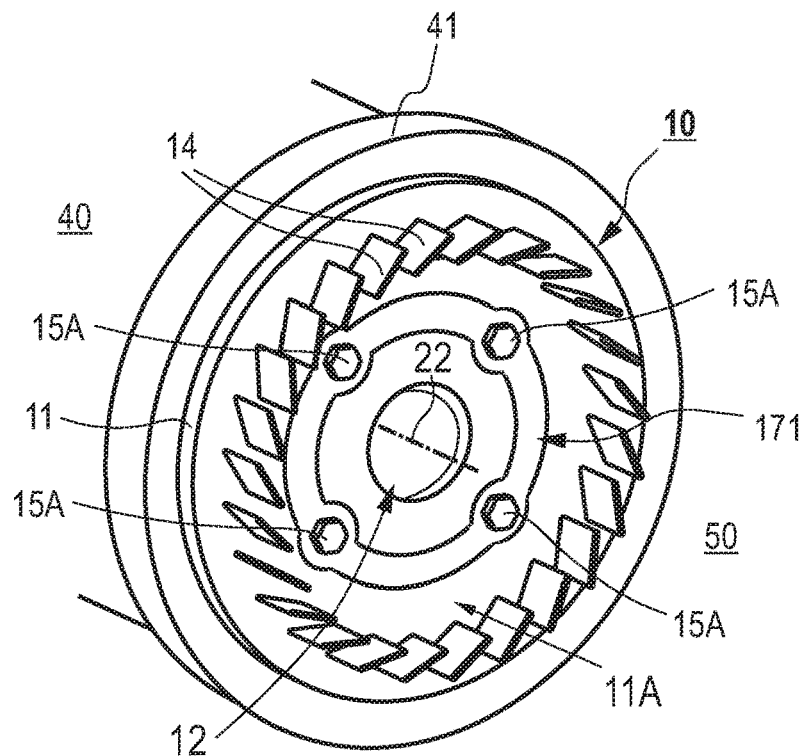
FIG. 3a shows a schematic isometric view of a nozzle ring according to embodiments described herein, wherein the nozzle ring is mounted to a bearing housing.
Figure 3B:
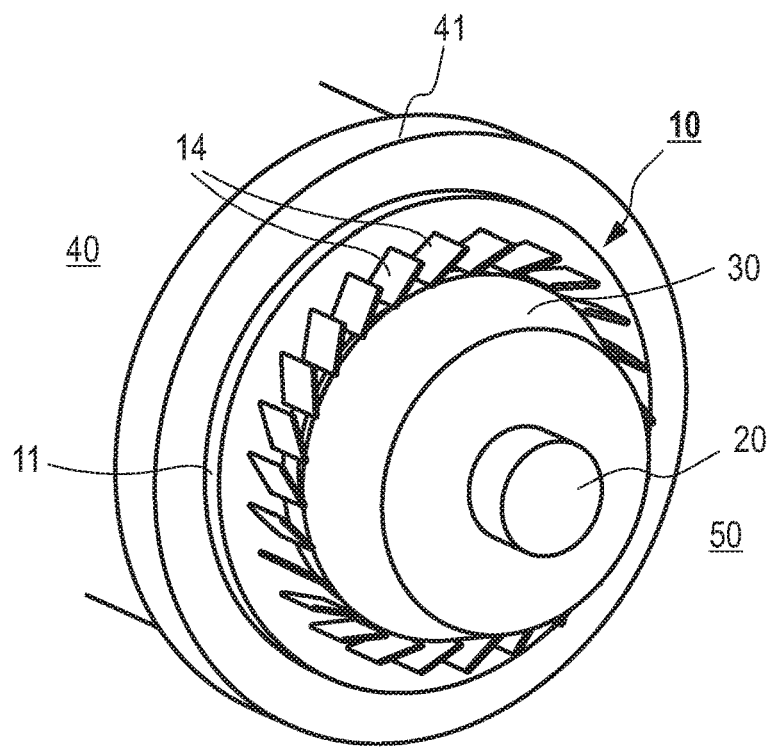
FIG. 3b shows the schematic isometric view of FIG. 3a further including a turbine wheel mounted to a shaft extending through a central opening of a nozzle ring according to embodiments described herein.
Figure 4:
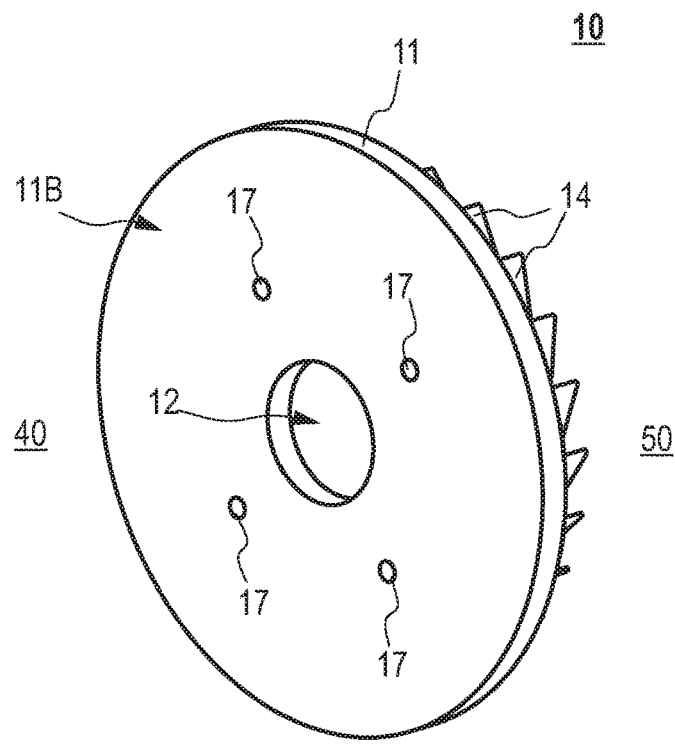
FIG. 4 shows a schematic isometric view on a second side, particularly a bearing housing side, of a nozzle ring according to embodiments described herein.

As exemplarily shown in FIG. 3a, the main body 11 of the nozzle ring as described herein can be configured to form a heat shield between a bearing space 40 of a bearing housing 41 and a turbine space 50 when assembled. Typically, the main body 11 of the nozzle ring extends radially outwards from the central opening 12, as exemplarily shown in FIGS. 1 and 3a. In particular, the main body of the nozzle ring is formed such that (apart from the bores 17) a closed surface is provided between the central opening 12 and the outer edge of the main body. Accordingly, beneficially a nozzle ring with an integrated heat shield can be provided, such that the number of individual elements and thus interfaces in the area of mounted nozzle ring can be reduced.

According to embodiments, which can be combined with other embodiments described herein, the groove 171 extends at least partially concentrically around the central opening 12, as exemplarily shown in FIG. 1. According to an example, the groove 171 is concentrically arranged around the central opening 12.

According to embodiments, which can be combined with other embodiments described herein, the groove 171 is a closed-loop groove. In particular, the groove 171 can be configured for connecting all of the two or more bores 17. FIGS. 1 and 3a show exemplary embodiments with four bores all of which being connected by the groove. However, it is to be understood that also other embodiments with two, three, five, six, seven, eight or more bores may be realized. Further, it is to be understood that the feature "the groove connecting at least two of the two of more bores" may apply to various embodiments, wherein the "at least two of the two of more bores" include two, three, four, five, six, seven, eight or more bores.

According to embodiments, which can be combined with other embodiments described herein, the two or more bores 17 are arranged on a first virtual circle line having a first radius $R_1$ around the central opening 12. Further, the guide vanes 14 may be arranged on a second virtual circle line having a second radius $R_2$ around the central opening 12. Typically, the second radius $R_2$ is $R_2 \geq 1.5 \times R_1$.

With exemplary reference to FIGS. 2a to 2d, according to embodiments, which can be combined with other embodiments described herein, groove 171 has a cross-sectional shape selected from the group consisting of: a rectangular U-shape, a square U-shape, a round U-shape, and a trapezoidal U-shape. The groove 171 can have one or more rounded edges.

As exemplarily indicated in FIGS. 2a to 2d, according to embodiments, which can be combined with other embodiments described herein, the groove 171 has a width W and a depth D. For instance, the width can be larger than or equal to the depth, i.e. W≥D. According to embodiments, which can be combined with other embodiments described herein, the groove 171 has a width-to-depth ratio W/D of 1≤W/D≤5, particularly of 1.5≤W/D≤4, more particularly of 2≤W/D≤3.

Alternatively, the depth D can be larger than or equal to the width, i.e. D≥W. Further, the groove 171 may have a depth-to-width ratio D/W of 1≤D/W≤5, particularly of 1.5≤D/W≤4, more particularly of 2≤D/W≤3.

According to embodiments, which can be combined with other embodiments described herein, the groove 171 may have a width W of 2 mm≤W≤10 mm and a depth D of 0.4 mm≤D≤10 mm.

Figure 5A:
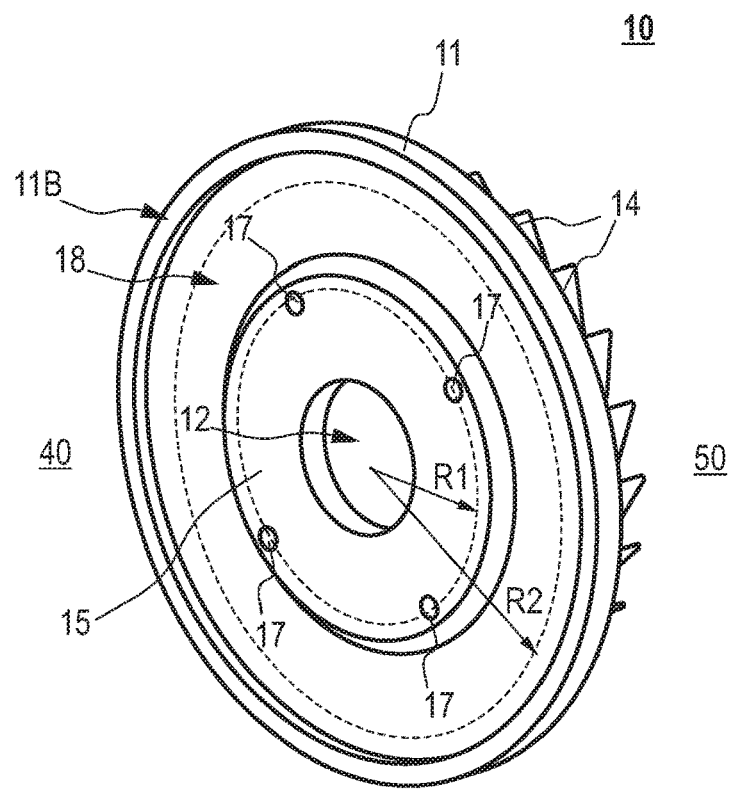
FIG. 5a shows a schematic isometric view on a bearing housing side of a nozzle ring according to embodiments described, the nozzle ring having a recess for forming an air-filled insulation space when the nozzle ring is mounted.
Figure 5B:
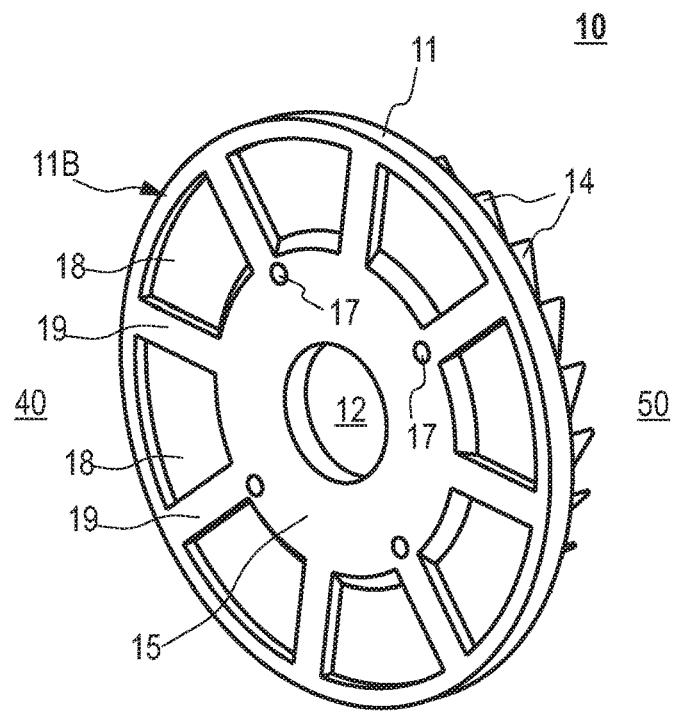
FIG. 5b shows a schematic isometric view on a bearing housing side of a nozzle ring according to embodiments described, the nozzle ring having two or more recesses separated by ribs, the recesses being configured for forming air-filled insulation spaces when the nozzle ring is mounted.

With exemplary reference to FIGS. 5a and 5b, according to embodiments, which can be combined with other embodiments described herein, the nozzle ring 10 may include a mounting flange 15 provided in a radially inner portion on a second surface 11B of the main body 11. Typically, the two or more bores 17 extend through the mounting flange 15.

According to embodiments, which can be combined with other embodiments described herein, the mounting flange 15 is integrally formed with the main body 11. Further, the guide vanes can be integrally formed with the main body 11. In particular, the nozzle ring can be an integral one piece element. For instance, the nozzle ring can be a machined, particularly milled, one-piece element. In other words, the complete nozzle ring may be a single piece structure.

Figure 6:
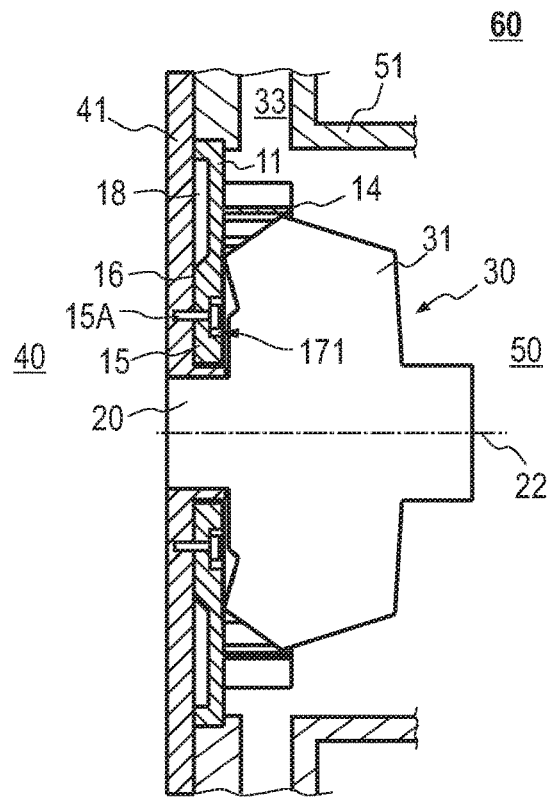
FIG. 6 shows a schematic cross-sectional view of a portion of an exhaust gas turbocharger having a nozzle ring according to embodiments described herein.

According to embodiments, which can be combined with other embodiments described herein, the two or more bores 17 are configured for receiving one or more fastening means 15A, as exemplarily shown in FIGS. 3a and 6.

According to embodiments, which can be combined with other embodiments described herein, the two or more bores 17 are arranged with a regular angular spacing around the central opening 12, as exemplarily shown in FIG. 1.

According to embodiments, which can be combined with other embodiments described herein, a second surface 11B of the main body 11, includes one or more recesses 18 for forming one or more air-filled insulation space(s) when the nozzle ring 10 is mounted. Further, radially extending ribs 19 may be provided as exemplarily shown in FIG. 5b. Such ribs can have a beneficial effect on the stability and thermal expansion behavior of the nozzle ring.

In the present disclosure, the second surface 11B of the main body typically refers to a bearing housing facing surface of the main body.

With exemplary reference to FIG. 6, an exhaust gas turbocharger 60 according to the present disclosure is described. According to embodiments, which can be combined with other embodiments described herein, the exhaust gas turbocharger 60 includes a turbine housing 51, a shaft being which is mounted in a bearing housing 41 and on which a turbine wheel 30 with rotor blades 31 is provided. Additionally, the exhaust gas turbocharger 60 includes an exhaust gas inlet passage 33 formed in the turbine housing 51 upstream of the turbine wheel 30. Further, the exhaust gas turbocharger 60 includes a nozzle ring 10 according to any embodiments described herein. In particular, as exemplarily shown in FIG. 6, the nozzle ring is fixed to the bearing housing 41 by fastening means 15A extending through the two or more bores 17. For instance, the fastening means 15A can be heat resistant fastening means.

Hence, in view of the above, it is to be understood that compared to the state of the art, the embodiments described herein provide for an improved nozzle ring and improved exhaust gas turbocharger. In particular, embodiments of the present disclosure have the advantage that rotor blade excitations of a turbine wheel can be reduced or even eliminated.

While the foregoing is directed to embodiments, other and further embodiments may be devised without departing from the basic scope, and the scope is determined by the claims that follow.

REFERENCE NUMBERS 10 nozzle ring
11 main body
11A first surface of main body
11B second surface of main body
12 central opening
14 guide vanes
15 mounting flange
15A fastening means
16 contact surface
17 bores
171 groove
18 recesses
19 ribs
20 shaft
22 central axis
30 turbine wheel
31 rotor blades
33 exhaust gas inlet passage
40 bearing space
41 bearing housing
50 turbine space
51 turbine housing
60 exhaust gas turbocharger

What is claimed is:

1. A nozzle ring for a radial turbine comprising:
a disc-shaped main body having a central opening for passing a shaft therethrough;
guide vanes disposed circumferentially in a radially outer portion on a first surface of the disc-shaped main body;
two or more bores provided in a radially inner portion of the disc-shaped main body; and
a groove provided in the first surface of the disc-shaped main body, the groove connecting at least two of the two or more bores.

2. The nozzle ring of claim 1, wherein the groove extends at least partially concentrically around the central opening.

3. The nozzle ring of claim 1, wherein the groove is a closed-loop.

4. The nozzle ring of claim 1, wherein the two or more bores are arranged on a first virtual circle line having a first radius $R_1$ around the central opening, and wherein the guide vanes are arranged on a second virtual circle line having a second radius $R_2$ around the central opening, wherein $R_2 \geq 1.5 \times R_1$.

5. The nozzle ring of claim 1, wherein the groove has a cross-sectional shape selected from the group consisting of: a rectangular U-shape, a square U-shape, a round U-shape, and a trapezoidal U-shape.

6. The nozzle ring of claim 5, wherein the groove has one or more rounded edges.

7. The nozzle ring of claim 1, wherein the groove has a width W and a depth D, the width being larger than or equal to the depth.

8. The nozzle ring of claim 7, wherein the groove has a width-to-depth ratio W/D of $1 \leq W/D \leq 5$.

9. The nozzle ring of claim 1, wherein the groove has a width W and a depth D, the depth being larger than or equal to the width.

10. The nozzle ring of claim 9, wherein the groove has a depth-to-width ratio D/W of $1 \leq D/W \leq 5$.

11. The nozzle ring of claim 1, wherein the groove has a width W of $2 \text{ mm} \leq W \leq 10 \text{ mm}$ and a depth D of $0.4 \text{ mm} \leq D \leq 10 \text{ mm}$.

12. The nozzle ring of claim 1, further comprising a mounting flange provided in the radially inner portion on a second surface of the disc-shaped main body, and wherein the two or more bores extend through the mounting flange.

13. The nozzle ring of claim 12, wherein the mounting flange is integrally formed with the disc-shaped main body.

14. The nozzle ring of claim 1, wherein the guide vanes are integrally formed with the disc-shaped main body.

15. The nozzle ring of claim 1, wherein the nozzle ring is an integral one-piece element.

16. The nozzle ring of claim 1, wherein the two or more bores are configured to receive one or more fasteners, and wherein the two or more bores are arranged with a regular angular spacing around the central opening.

17. The nozzle ring of claim 1, wherein a second surface of the disc-shaped main body comprises one or more recesses for forming one or more air-filled insulation space(s) when the nozzle ring is mounted to a bearing housing.

18. The nozzle ring of claim 1, wherein the groove connects all of the two or more bores.

19. An exhaust gas turbocharger comprising:
a turbine housing,
a shaft which is mounted in a bearing housing and on which a turbine wheel with rotor blades is arranged,
an exhaust gas inlet passage formed in the turbine housing upstream of the turbine wheel, and
the nozzle ring according to claim 1, the nozzle ring fixed to the bearing housing by fasteners extending through the two or more bores.

* * * * *